United States Patent
Jones et al.

(10) Patent No.: US 8,051,334 B2
(45) Date of Patent: Nov. 1, 2011

(54) ENABLING SAS EXPANDER LOOPS FOR INCREASED FAIRNESS AND PERFORMANCE

(75) Inventors: Marc Timothy Jones, Costa Mesa, CA (US); Ernest John Frey, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 326 days.

(21) Appl. No.: 11/940,144

(22) Filed: Nov. 14, 2007

(65) Prior Publication Data
US 2009/0125655 A1     May 14, 2009

(51) Int. Cl.
*G06F 11/00*     (2006.01)
(52) U.S. Cl. ............... 714/43; 714/4.1; 714/4.2; 714/2; 714/4.11
(58) Field of Classification Search .............. 714/42, 714/43, 2, 4.1, 4.11, 4.2
See application file for complete search history.

(56) References Cited

U.S. PATENT DOCUMENTS

| | | | |
|---|---|---|---|
| 6,012,151 A * | 1/2000 | Mano | 714/11 |
| 2003/0023749 A1* | 1/2003 | Lee et al. | 709/240 |
| 2005/0071532 A1* | 3/2005 | Bakke et al. | 710/300 |
| 2005/0286551 A1* | 12/2005 | Berman | 370/465 |
| 2007/0088829 A1* | 4/2007 | Shima et al. | 709/226 |
| 2007/0162592 A1* | 7/2007 | Marks et al. | 709/224 |
| 2008/0028107 A1* | 1/2008 | Cherian et al. | 710/9 |

* cited by examiner

*Primary Examiner* — Scott Baderman
*Assistant Examiner* — Sarai Butler
(74) *Attorney, Agent, or Firm* — Morrison & Foerster LLP (57) ABSTRACT

The use of loops in SAS networks is enabled by designating ports connected to loop connections as table loop ports (TLPs). Under normal operating conditions, each TLP is blocked from receiving BCNs, appears to the expander to have nothing connected to it, and is made invisible to initiators. The loop connection and TLPs may be enabled and used to access devices when a problem is detected. In particular, the TLP will now appear in a list of destination ports within the expander to which a BCN should be propagated. In addition, during a subsequent self-configuration, the TLP is allowed to populate its route table with devices accessible through it, and the existence of the TLP is also reported back to initiators. After re-discovery is complete, communications between the initiator and a target can resume, with traffic re-routed through the TLPs as needed, bypassing the failure point.

20 Claims, 8 Drawing Sheets

ENABLING SAS EXPANDER LOOPS FOR INCREASED FAIRNESS AND PERFORMANCE

FIELD OF THE INVENTION

This invention relates to Serial Attached Small Computer System Interface (SAS) expanders, and more particularly to enabling loop configurations between SAS expanders to increase fairness and performance.

BACKGROUND OF THE INVENTION

A SAS expander can generally be described as a switch that allows initiators and targets to communicate with each other in a network, and allows additional initiators and targets to be added to the network. The SAS-2 protocol, the specification of which is currently available in draft form (Revision 12, Sep. 28, 2007) at www/t10.org and identified as T10/1760-D or Reference Number ISO/IEC 14776-152:200x, the contents of which are incorporated by reference herein, supports networks including cascades and trees (as well as trees of cascades) of SAS expanders. Typically, a cascade utilizes a single wide-port (containing multiple Phys) for connecting the expanders together with multiple physical connections.

As speeds for SAS increase, the size of SAS networks also increases. However, this increase in size can result in new problems. For cascades of SAS expanders, cascade depths must be kept to a minimum due to the increased congestion in the cascade links, in particular for devices creating connections up and down the cascade.

Another problem with cascades is the possibility of single point failure. For example, if the connection between two cascaded SAS expanders fails, then all connectivity is lost for initiators and targets on opposite sides of the failure point. The single point failure arises because there is no fail-over path for such connections.

Setting aside SAS-2 compatibility for the moment, one way to increase connectivity and provide a fail-over path is to provide a secondary connection. This secondary connection, which essentially forms a loop in the SAS network, can provide a number of advantages. First, the loop can provide increased availability in the face of expander failures or expander enclosure hot plugs. In a failure scenario, the SAS network can fail-over to the loop, bypassing the failure point, to restore connectivity between devices.

Figure 1:
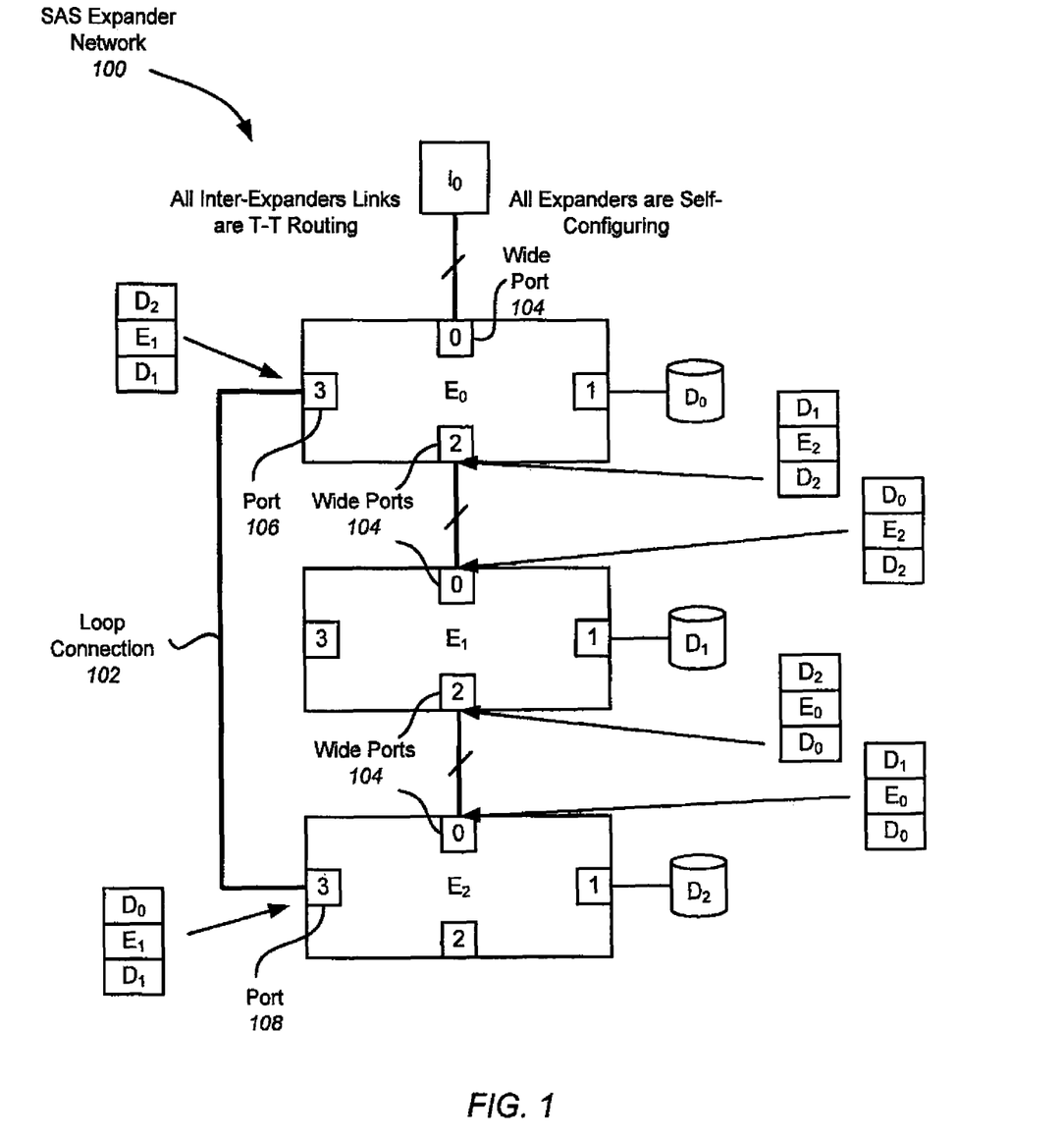
FIG. 1 illustrates an exemplary SAS expander network including a loop connection.

FIG. 1 illustrates an exemplary SAS expander network 100 that is conventional except for the addition of a loop connection 102. FIG. 1 shows an initiator ($I_0$) connected via multiple lines to a cascade of SAS expanders, E0, E1 and E2 through wide ports 104 on each expander. Attached to each SAS expander may be one or more SAS or SATA drives D0, D1 and D2. In FIG. 1, loop connection 102 is formed by a connection between port 106 on E0 and port 108 E2. By introducing loops into the network topology, SAS looks more like FC arbitrated loop, but without the loss of I/O during loop initialization primitive (LIP) periods.

In the example of FIG. 1, if the loop connection 102 were not present and the connection between E0 and E1 were to fail, the failure would represent a single point failure, and any devices connected to E0 (e.g. initiator I0 and drive $D_0$) would not be able to communicate with any devices connected to E1 or E2 (e.g. drives D1 and D2). However, with loop connection 102 present, the loop connection provides a secondary or fail-over path to enable $I_0$ or D0 to bypass the failed connection and resume communication with D1 and D2.

In addition to providing a fail-over path, the increased opportunities for connectivity realized by loops provides a number of other advantages to SAS networks, including increased performance due to multi-path access to devices (reduced hop-count). For example, in FIG. 1, if initiator I0 desired to communicate with device D2, it would have to traverse all three expanders E0, E1 and E2 to get to the device. This introduces latency into the communication as well as locking down pathway resources in the SAS network. With a loop connection 102, the initiator $I_0$ or expander E0 could decide that to communicate with device D2, a better path is directly from E0 to E2 through the loop connection. This minimizes an expander hop (in the present example of a three expander network), minimizes congestion in the core, and minimizes latency of the overall connection (which at 6 G can be significant). Note with deeper cascades, of 16 expanders, the savings become more apparent.

Yet another advantage of loops is increased fairness as multiple paths can exist to devices (maximum (N/2)+1).

Notwithstanding these advantages, loops are currently illegal in SAS-2, and create several problems with regard to (1) broadcast change notification (BCN) Management (broadcast primitives), (2) Loop Configuration and Multi-pathing, and (3) Initiator Awareness of Loops.

The first problem relates to BCN management. BCNs are used to notify expanders and other devices such as initiators when there are changes to the network (e.g. the presence of a new device, a removed device, or a malfunctioning device), so that they can re-discover the network. When a change occurs in the network such as a disk insertion, SAS expander or attached device is detected by a port in a SAS expander, a BCN (a SAS primitive containing no address information) is generated and sent to all ports in that SAS expander except for the port that originated the BCN. In a traditional SAS network, the BCN is propagated out through the ports, eventually reaching one or more expanders where it can propagate no further (a leaf or edge expander, for example). However, if a loop is present, a BCN can theoretically propagate forever as it cycles endlessly through the loop.

The second problem relates to loop configuration and multi-pathing. In SAS-2, expanders are self-configuring. Self-configuring expanders take care of their own configuration—route tables, programming, and the like. A self-configuring expander discovers each attached expander and attached devices to program a Phy-based routing table for each port in that expander. In other words, self-configuring expanders enumerate the entire domain by locating every device in the network and creating a routing table for each port, the routing table containing addresses to those devices accessible through that port.

However, if an expander is not aware of a loop connection, it will try to locate devices found through the loop connection and create a route table for the port connected to the loop connection. If a loop is present, the expander can theoretically perform discovery forever as it cycles endlessly through the loop, continuously locating devices and storing addresses of those devices in the routing table. Because a loop exists, each expander can discover the entire SAS network from two directions, which means that each device will be viewed at least twice. In practice, however, the domain may be declared invalid and a vendor-specific action can be taken to prevent discovery from being continuously performed. In any case, both approaches (discovery forever and declaring a bad domain) indicate the problem.

The third problem relates to initiator awareness of loops. Initiators attempt to enumerate the entire domain to which they are attached. For example, in FIG. 1, the initiator will attempt to discover all information about devices attached to E0, then E1, the E2. However, because of the loop on E2, the initiator will then attempt to discover all information about devices attached to E0 again, and this enumeration or discovery process can go on forever if the initiator is not designed to detect the problem. Initiators capable of detecting the problem can declare a bad domain and report it to the host to prevent discovery from going on forever.

These problems, if left uncorrected, can result in a non-operating network. Therefore, there is a need to be able to utilize loop configurations in SAS networks without creating problems related to BCN management, loop configuration and multi-pathing, and initiator awareness of loops.

SUMMARY OF THE INVENTION

Ports in SAS expanders are commonly designated with routing attributes to instruct the expander how to manage connections for the ports. SAS-2 supports table, subtractive, and direct attributes. Embodiments of the invention are directed to enabling loops to be used in SAS networks by creating and assigning a new "table loop" attribute to ports connected to loop connections. A port having a table loop attribute may be referred to herein as a table loop port (TLP). The table loop attribute adopts properties borrowed from the table attribute (i.e. a route table is associated with each TLP), plus a loop designation is added that is only active in certain instances.

To create a TLP, an administrator can manually modify the configuration of particular Phy in particular expanders in view of the intended expander configuration. To manually modify the configuration, a number of methods may be used. One way is the use the SAS in-band management protocol (SMP). The administrator can also operate a device directly attached to an expander to perform the configurations. A local area network (LAN) could also be connected to each of the expanders, and configuration can take place through the LAN.

In a conventional SAS expander, the ports in that expander propagate a received BCN to other destination ports in that expander according to a list. However, no BCNs will be broadcast or propagated to a TLP, preventing the BCNs from being propagated indefinitely though the loop and cycled through a SAS network. Thus, from the perspective of the BCNs, it will appear that no loop exists.

In a conventional SAS expander, during self-configuration the expander is able to determine what is connected through a port, and create a route table of device addresses accessible through that port. However, a SAS expander will initially ignore the TLP during its self-configuration process. Although the expander is aware of the existence of the TLP, the TLP will indicate that nothing is attached to it, and thus the TLP will be hidden and appear that it does not exist.

In a conventional discovery process, if a BCN is received by an initiator, indicating a change in the SAS network, the initiator can initiate a re-discovery of the SAS through the in-band protocol SMP. Upon receiving this re-discovery request, the expanders then send SMP REPORT_GENERAL commands back to the initiator, reporting back the number of Phy in each expander. The initiator can then send an SMP DISCOVER command back to the Phys. Each Phy then reports back to the initiator what is attached to that Phy. However, a TLP will not report its existence back to the initiator, and thus the TLPs will essentially be made invisible to the initiator during the discovery process. In this way, initiators will not be aware that the loops actually exist. Internal to the expanders, though, the loops are understood and used in standard routing and connection management.

In summary, under normal operating conditions, each TLP (1) is blocked from receiving BCNs, (2) appears to the expander to have nothing connected to it, and (3) is made invisible to initiators. Essentially, the loop connection and TLP is disabled by any one or more of these actions, preventing communications from traveling through the TLP and over the loop connection.

The loop connection and TLPs may be used as a secondary means to access devices when a problem is detected in the SAS network. For example, if a failure occurs, resulting in a Phy state change, the SAS expander can perform self-configuration and determine that a TLP is no longer visible through a wide port, indicating a problem with the connection between the SAS expander and the TLP and that some sort of reconfiguration is necessary. The firmware in the SAS expander will then enable the TLP so that devices are now accessible through the TLP instead of the original path. In particular, the TLP will now appear in a list of destination ports within the expander to which a BCN should be propagated. In addition, during a subsequent self-configuration, the TLP is allowed to populate its route table with devices accessible through it, and the existence of the TLP is also reported back to initiators.

If failure point is detected as described above, BCNs generated as a result of the detected failure are propagated through the TLPs. When the expanders receive the BCNs, they perform self-configuration and generate new route tables based on what is accessible through the ports. When the initiator performs re-discovery of the SAS network as a result of receiving the BCNs, the TLPs and their associated route tables will now be visible and available for use during the discovery process. After re-discovery is complete, communications between the initiator and a target can resume, with traffic re-routed through the TLPs as needed, bypassing the failure point.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

Embodiments of the invention are directed to enabling loops to be used in SAS networks by creating an assigning a new "table loop" attribute to ports connected to loop connections. A port having a table loop attribute may be referred to herein as a table loop port (TLP). Under firmware control, BCNs will never be propagated to TLPs, thus solving the problems associated with BCN management in the presence of loops. In addition, TLPs will remain invisible to any initiators and expanders unless a failure is detected, thus solving the problems associated with expander self-configuration and initiator re-discovery in the presence of loops.

Although embodiments of the invention may be described herein primarily in terms of SAS devices, it should be understood that embodiments of the invention are not so limited, but extend to other compatible devices such as Serial Advanced Technology Attachment (SATA) devices, which can connect to SAS expanders through a special port known as a SATA Tunneling Protocol (STP) port.

Each expander has an associated configuration, and each Phy or port within an expander also has an associated configuration. For example, a Phy can have a configuration that indicates it is a certain type of port, capable of operating up to a certain maximum speed, etc. Ports in the expander are commonly designated with routing attributes to instruct the expander how to manage connections for the ports. SAS-2 supports table, subtractive, and direct attributes. The table attribute indicates that there is a table associated with the Phy (port) containing a list of addresses to devices accessible through that port. The subtractive attribute causes requests to be sent out on a default port if the proper port or direct attachments cannot be located for the request (e.g. the destination address is not found in any routing table associated with any port in that expander). The direct attribute is given to devices that are directly attached to that expander, and are not expander attached (attached through another expander).

In general, any port that is connected to another expander (except those connected to another expander through a loop) is given a table attribute, and is referred to herein as a table port. Any port connected directly to a drive is given a direct attribute. This configuration information can be stored in flash memory, and when the expander is booted, the configuration information stored in flash is loaded into RAM for use, and then assigned to the various ports.

In embodiments of the invention, a fourth attribute, a table loop, is created. A port with a table loop attribute is referred to herein as a table loop port (TLP). The table loop attribute adopts properties borrowed from the table attribute (i.e. a route table is associated with each TLP), plus a loop designation is added that is only active in certain instances.

To create a TLP, an administrator can manually modify the configuration of particular Phy in particular expanders in view of the intended expander configuration. To manually modify the configuration, a number of methods may be used. One way is the use the SAS in-band management protocol, SMP. The administrator can also operate a device directly attached to an expander to perform the configurations. A LAN could also be connected to each of the expanders, and configuration can take place through the LAN.

Figure 2A:
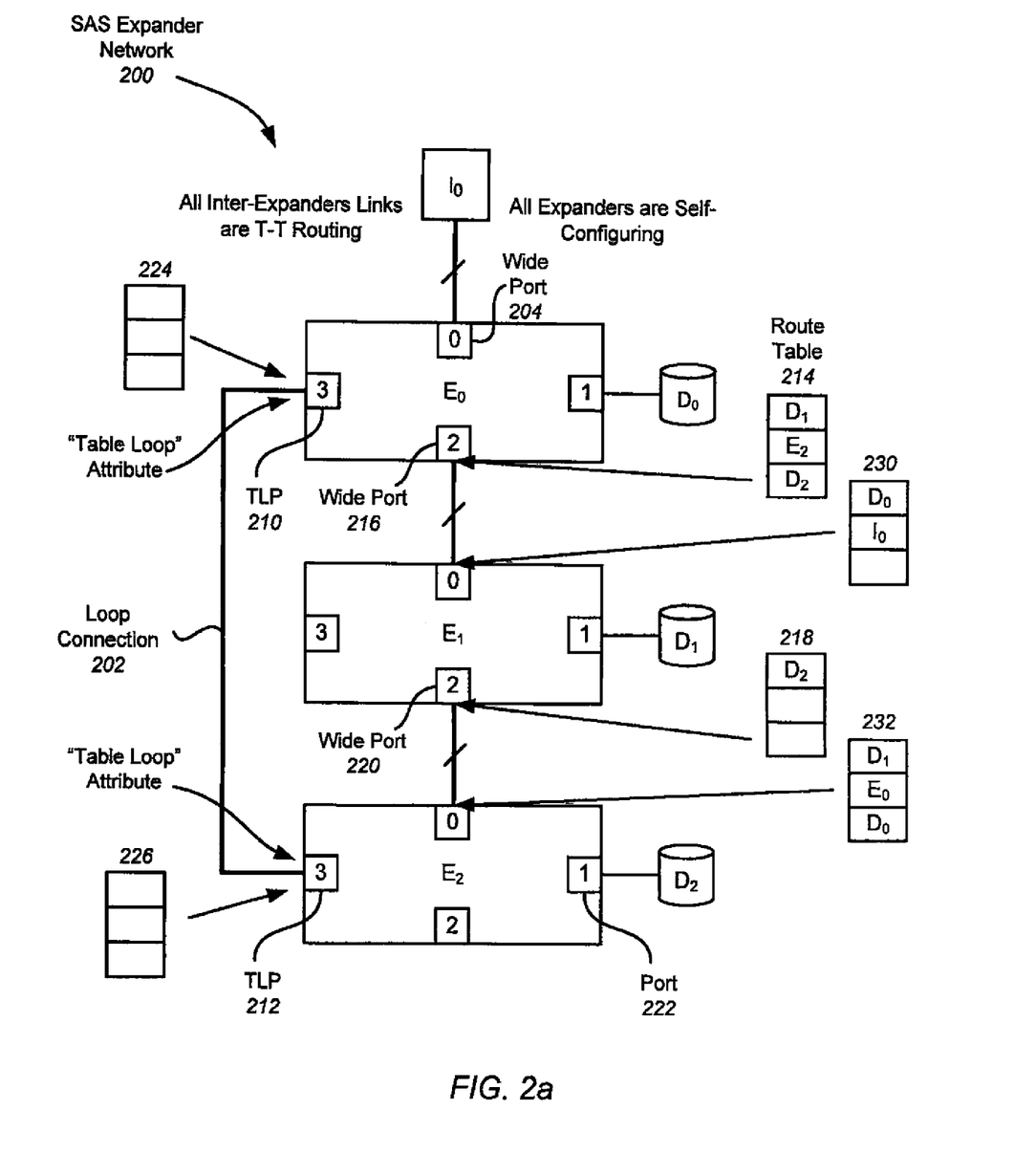
FIG. 2a illustrates an exemplary SAS expander network utilizing a loop connection and TLPs according to embodiments of the invention.

FIG. 2a illustrates an exemplary SAS expander network 200 utilizing a loop connection 202 and TLPs 210 and 212 according to embodiments of the invention. In other words, the table loop attribute was assigned to ports 210 and 212 making the loop connection 202. Note that a system administrator may designate certain ports within a SAS expander to be TLPs, either individually or through a SAN management application that may use in-band (e.g. SMP) or out-of-band (e.g. separate Ethernet connection) communications to configure the SAS expanders.

With regard to the first problem, that of BCN propagation in the presence of loops, the firmware manages TLPs differently than other ports according to embodiments of the invention. In a conventional SAS expander, the ports in that expander are programmed, under firmware control, to propagate a received BCN to other destination ports in that expander according to a list. However, according to embodiments of the invention, under firmware control no BCNs will be broadcast or propagated to a TLP. By default, under normal conditions the TLP will never appear in a list of destination ports to which a BCN should be propagated, and therefore BCNs are prevented from being propagated indefinitely though the loop and cycled through a SAS network. Thus, from the perspective of the BCNs, it will appear that no loop exists. It should be understood that is not necessary to propagate BCNs through a TLP because in theory there should always be another way to propagate the BCNs through to the expander at the other end of the loop connection.

With regard to the second problem, that of self-configuring SAS expanders that create route tables in the presence of loops, the firmware can program the expander to initially ignore the TLP during its self-configuration process according to embodiments of the invention. In a conventional SAS expander, during self-configuration the expander is able to determine what is connected through a port, and create a route table of device addresses accessible through that port. However, according to embodiments of the invention, although the expander is aware of the existence of the TLP, under firmware control the TLP will indicate that nothing is attached to it, and thus the TLP will be hidden and appear that it does not exist. Thus, in a normal condition, route table 214 for wide port 216 in E0 will be generated, but route table 224 for TLP 210 will be blank. Similarly, route table 226 for TLP 212 in E2 will be blank.

With regard to the third problem, that of initiator discovery in the presence of loops, the TLPs will essentially be made invisible to the initiator during the discovery process according to embodiments of the invention. In this way, initiators will not be aware that the loops actually exist. Internal to the expanders, though, the loops are understood and used in standard routing and connection management. In the conventional discovery process, if a BCN is received by an initiator, indicating a change in the SAS network, the initiator can initiate a re-discovery of the SAS through the in-band protocol SMP. Upon receiving this re-discovery request, the expanders then send SMP REPORT_GENERAL commands back to the initiator, reporting back the number of Phy in each expander. The initiator can then send an SMP DISCOVER command back to the Phys. Each Phy then reports back to the initiator what is attached to that Phy. Under firmware control, however, a TLP will not report its existence back to the initiator. In other words, the expanders will not make the TLPs visible to the initiators during discovery.

In summary, under normal operating conditions, each TLP (1) is blocked from receiving BCNs, (2) appears to the expander to have nothing connected to it, and (3) is made invisible to initiators. Essentially, the loop connection and TLP is disabled by any one or more of these actions, preventing communications from traveling through the TLP and over the loop connection.

Thus, under normal operating conditions (no failures within the network), if I0 wants to communicate with drive D2 and therefore sends an OPEN frame (a request) to E0, within E0 and under firmware control, drive D2 will be found in route table 214, but route table 224 associated with TLP 210 will be empty (even though D2 is in fact accessible through the TLP), and thus the request will be forwarded through port 216. Within E1, drive D2 will be found in route table 218, and the request will be forwarded through port 220. Within E2, drive D2 will be found to be directly attached to E2, and the request will be forwarded to drive D2 through port 222 attached to D2.

It should be understood that TLPs, while initially made invisible to initiators by the firmware, are visible to the expanders, although made to appear as though nothing was connected to them. Accordingly, in the example of FIG. 2a, expander E0 is aware of the existence of TLP 210, which appears to have nothing connected to it. If, after self-configuration, E0 finds another TLP 212, it can be assumed that the other end of TLP 210 has been found, and that the SAS domain is operating normally. However, if after self-configuration E0 cannot see TLP 212, a failure condition of some sort is presumed.

Figure 2B:
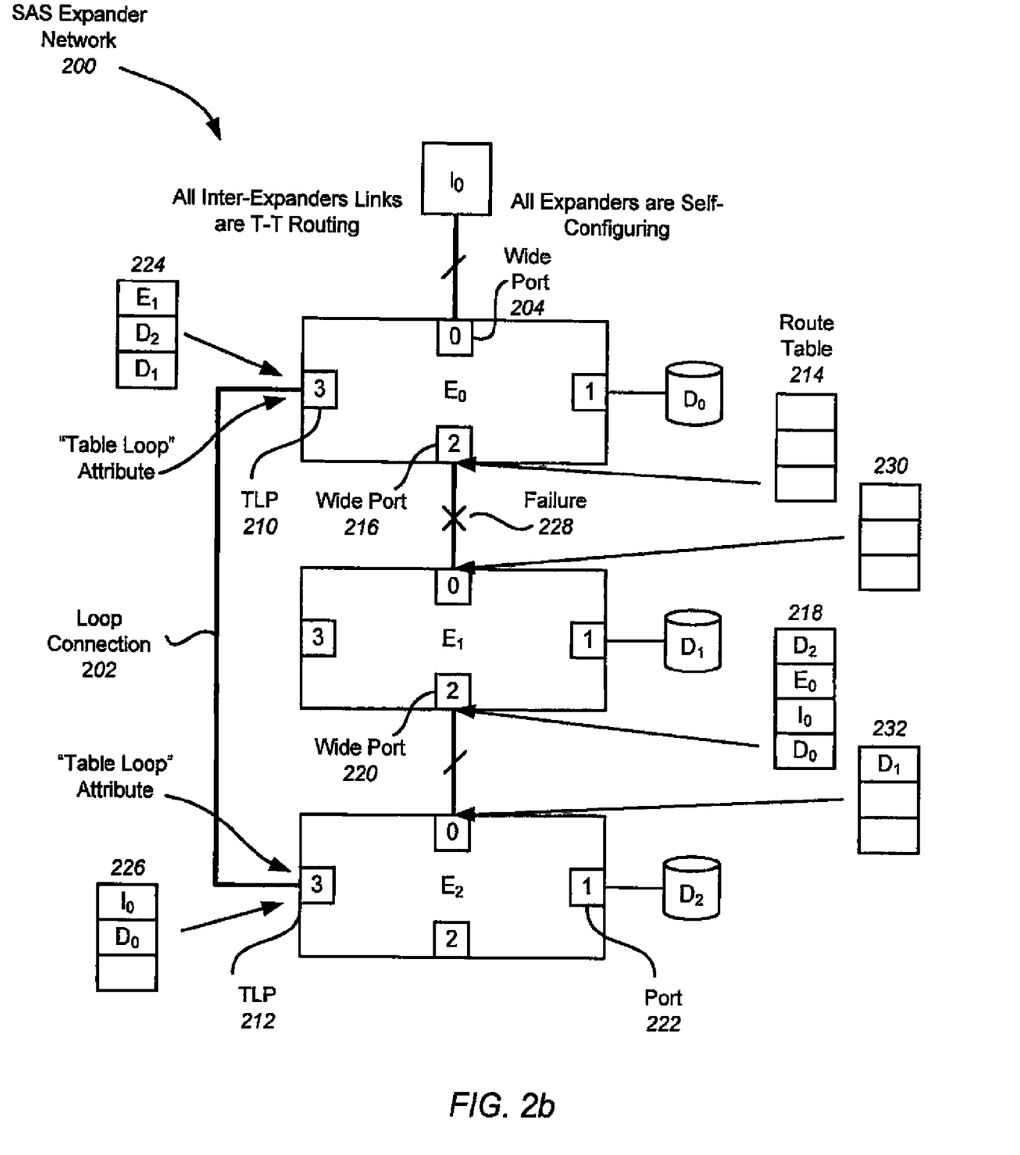
FIG. 2b illustrates the exemplary SAS expander network of FIG. 2b utilizing a loop connection and TLPs in a failure condition according to embodiments of the invention.

FIG. 2b illustrates the exemplary SAS expander network 200 of FIG. 2a utilizing a loop connection 202 and TLPs 210 and 212 in a failure condition according to embodiments of the invention. In the example of FIG. 2b, TLP 210, loop connection 202 and TLPs 210 and 212 are used as a secondary means to access devices only when a problem is detected in the SAS network. For example, if a failure occurs at 228, resulting in a Phy state change at 216, E0 then performs self-configuration and determines that TLP 212 is no longer visible through wide port 216, indicating a problem with the connection between E0 and TLP 212 and that some sort of reconfiguration is necessary. The firmware in expander E0 will then enable TLP 210 so that devices are now accessible through the TLP instead of the original path. In particular, TLP 210 will now appear in a list of destination ports within expander E0 to which a BCN should be propagated. In addition, during a subsequent self-configuration, TLP 210 is allowed to populate its route table with devices accessible through it, and the existence of TLP 210 is also reported back to initiators.

Similarly, if E2 also determines that a problem with the connection has occurred, firmware in expander E2 will then enable TLP 212 so that devices are now accessible through the TLP instead of the original path. In particular, TLP 212 will now appear in a list of destination ports within expander E2 to which a BCN should be propagated. In addition, during self-configuration, TLP 212 is allowed to populate its route table with devices accessible through it, and the existence of TLP 212 is also reported back to initiators.

If failure point 228 is detected as described above, BCNs generated as a result of the detected failure are propagated through TLPs 210 and 212. When the expanders receive the BCNs, they perform self-configuration and generate new route tables based on what is accessible through the ports. FIG. 2b shows new route tables 214, 218, 224, 226, 230 and 232 generated as a result of expander self-configuration.

When the initiator I0 performs re-discovery of the SAS network as a result of receiving the BCNs, the TLPs and their associated route tables will now be visible and available for use during the discovery process. After re-discovery is complete, communications between I0 and a target can resume, with E0-E2 re-routing traffic through the TLPs 210 and 212 as needed, bypassing failure point 228.

When a loop exists in a SAS network, each expander is capable of "seeing" the entire domain from two directions. This means that each device in the domain can be accessed twice, but at different distances. Using this distance information, an expander can specify a preferred route to use for a device.

Figure 2C:
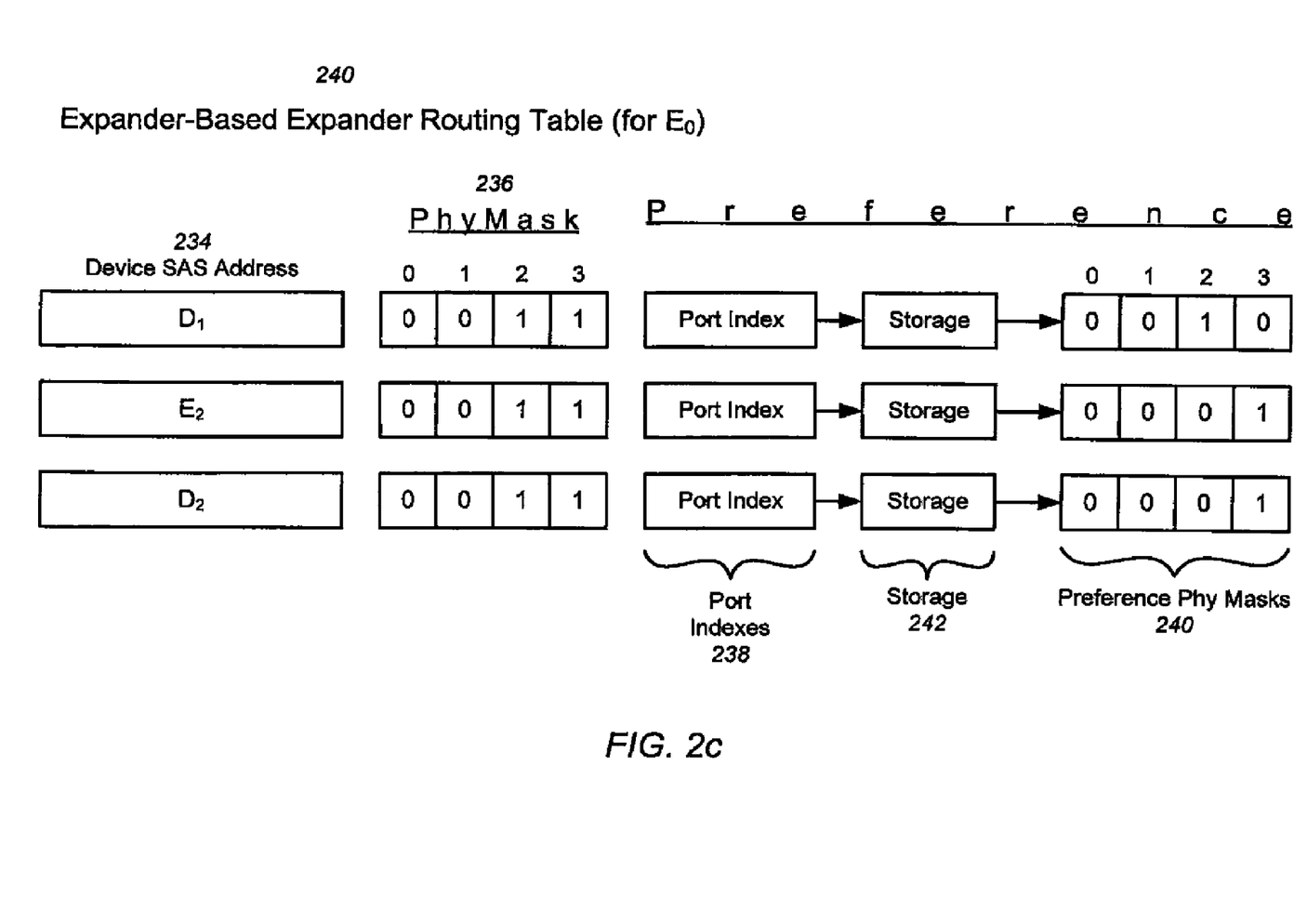
FIG. 2c illustrates an exemplary expander-based routing table associated with a wide port in expander E0 of FIGS. 2a and 2b according to embodiments of the invention.

FIG. 2c illustrates an exemplary expander-based routing table 240 associated with expander E0 of FIG. 2a according to embodiments of the invention. In this embodiment, unlike the previous failover embodiment, TLPs and loop connections are made visible to the expanders and initiators at all times. This expander-based routing table 240 is different from the route tables associated with each port in the expander, and is created after the TLPs have been enabled and the route tables for each port have been generated. For each SAS address 234 (each device) in the network, the expander-based routing table 240 defines the Phys (via the Phy Mask 236) needed to access that device. For example, referring again to FIG. 2a, a connection from E0 to device D1 can be established through Phy 2 (wide port 216) (the traditional route), or through Phy 3 (TLP 210). This is indicated by the presence of asserted bits in locations 2 and 3 of the Phy mask associated with D1. Through Port Index 238 (described in further detail below), the preference for this address is selected to be wide port 216. In one embodiment, the preference for wide port 216 is based on the spatial distance between E0 and the target devices. Thus, in the example of FIG. 2c, wide port 216 is preferred because it is two hops away as compared to TLP 210, which is three hops away. This is indicated by the presence of an asserted bit in location 2 of the preference Phy mask associated with D1. However, if wide port 216 were busy, TLP 210 could be used instead, increasing the availability of the network. Alternatively, the preference Phy Mask 240 may use other factors to determine the preferred Phy. If a failure should occur in the network, embodiments of the invention can switch to the above-described failover embodiment, in which case there may be no more options available, and traffic would have to be routed through the located failover path.

In another embodiment of the invention, rather than use a preference mask, the routing tables can be built using a metric of distance between the initiators and the end-devices. In this case, the traditional cascade port and TLP are each active, but have a unique set of devices that are visible through each of them. In this embodiment, a device is included in the routing table for a particular Phy only if the distance to that device is less than or equal to the distance through an alternate Phy. If a failure should occur in the network, embodiments of the invention can switch to the above-described failover embodiment, in which case the route tables can be re-programmed and traffic can be routed through the located failover path.

The Port Index 238 defines a collection of one or more Phys and uses fewer bits than a Phy Mask 238. The Port Index 238 is used to access storage 242 to retrieve a Preference Phy Mask 240. Because the Phy Mask 236 defines all possible paths to a device through a given expander, the availability of the device through this expander can be calculated.

The use of loops in a SAS network also supports a type of routing symmetry which can decrease congestion in the network. For example, conventional cascade ports can be designated for connections from initiators to end-devices, and TLPs can be designated for end-device to initiator connections. In this manner, connections are only established in one direction, and therefore never compete upstream and downstream with one another (a commonly viewed fairness problem with SAS).

Figure 3:
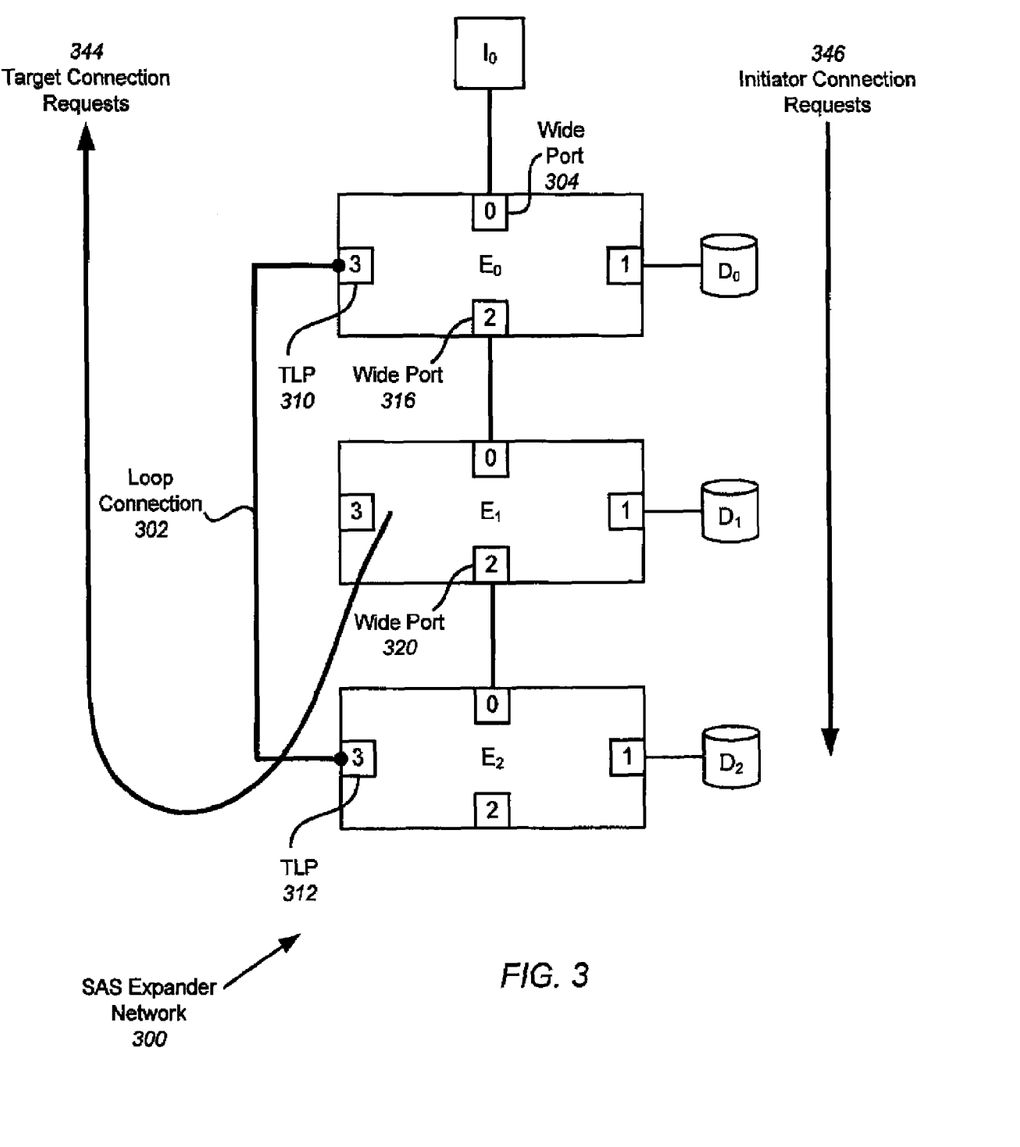
FIG. 3 illustrates an exemplary SAS expander network with routing symmetry according to embodiments of the invention.

FIG. 3 illustrates an exemplary SAS expander network 300 with routing symmetry according to embodiments of the invention. When initiator I0 connects to a device on E0 (e.g. D0), the device is directly attached and uses no inter-expander ports. Otherwise, the typical cascade ports (e.g. wide ports 316 and 320) are used to initiate the request (see reference character 346). In the embodiment of FIG. 3, response connections flow in the same direction (see reference character 344), using the "Table-Loop" port (e.g. E1 and E2 use TLPs 312 and 310 to send responses back to the initiator I0). This routing symmetry solves the deadlock issue that can exist in SAS (where an initiator at the top of a domain attempts to connect to a device at the bottom, while the device at the bottom attempts to connect back to the initiator). Depending upon congestion, each connection can be blocked by one another, arbitrating within expanders for pathway resources above and below.

To create this routing symmetry, firmware can program the expander-based routing tables shown in FIG. 2c to define preferences such that the initiators use one path to access devices, while devices use another path (the loop) to respond to the initiator.

Figure 4:
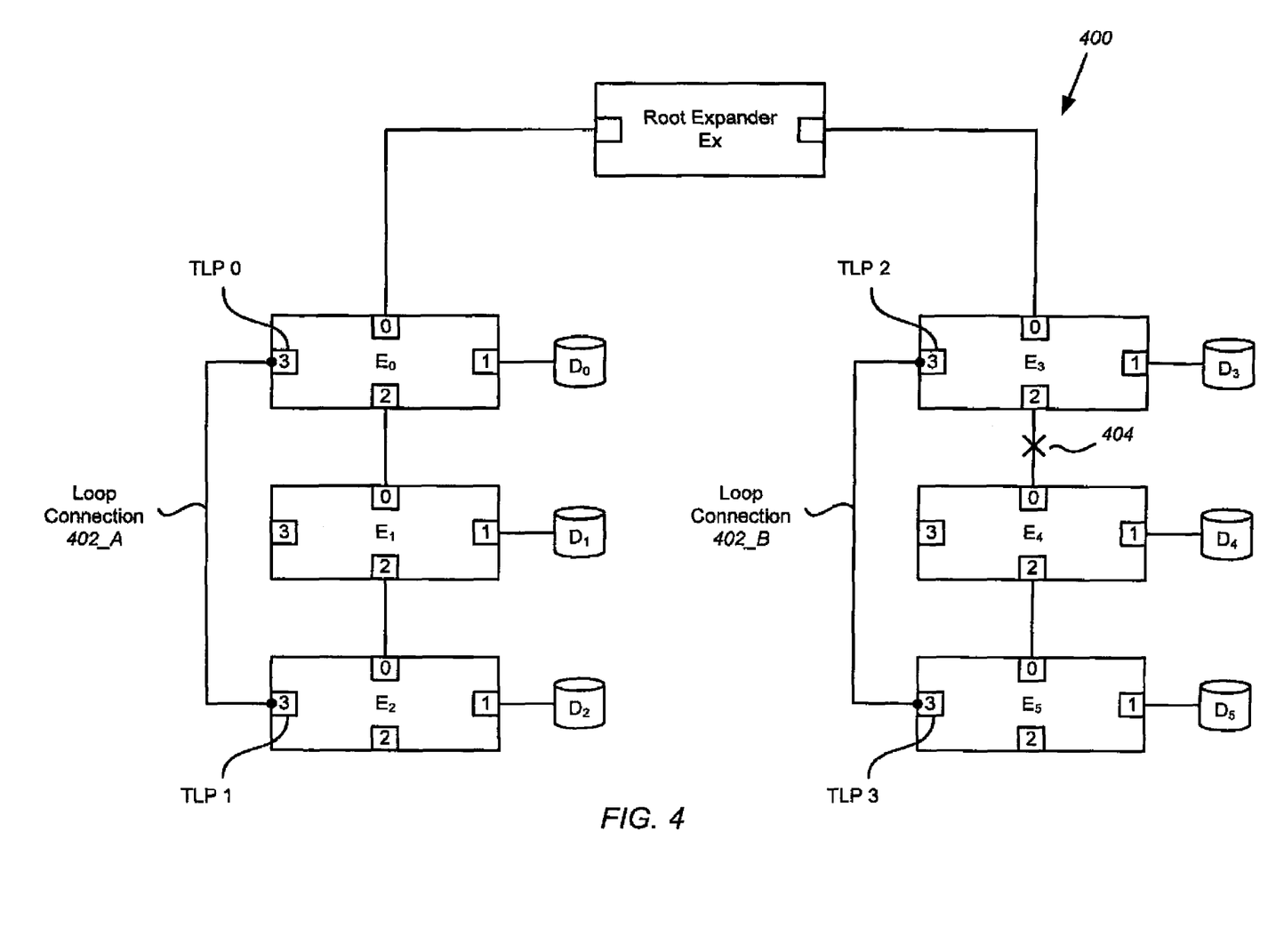
FIG. 4 illustrates an exemplary SAS expander network including multiple loops according to embodiments of the invention.

FIG. 4 illustrates an exemplary SAS expander network 400 including multiple loops according to embodiments of the invention. In FIG. 4, separate expander loops are formed with loop connections 402_A and 402_B, but the loops are connected together with a root expander Ex. The TLPs in a single loop can be given a particular designation to relate the TLPs to each other and to give each loop a unique identifier. For example, in FIG. 4 the TLPs providing loop connection 402_A can be given the designation TLP0 and TLP1, which can be an indication that they are related, while the TLPs providing loop connection 402_B can be given the designation TLP2 and TLP3, which can be an indication that they are related. Under normal operating conditions, E0 of FIG. 4 should be able to access all four TLPs.

However, if there is a problem with the network and a BCN is received by the expanders, the expanders will perform self-configuration and attempt to enumerate the network. For example, suppose that a failure occurs at connection 404. During self-configuration, E0 will be able to see TLP1 through two different paths, so E0 will not detect any problem with its loop connection. However, E3 will only be able to see TLP3 through loop connection 402_B. In this case, it will be understood that failover must take place through loop connection 402_B.

Figure 5:
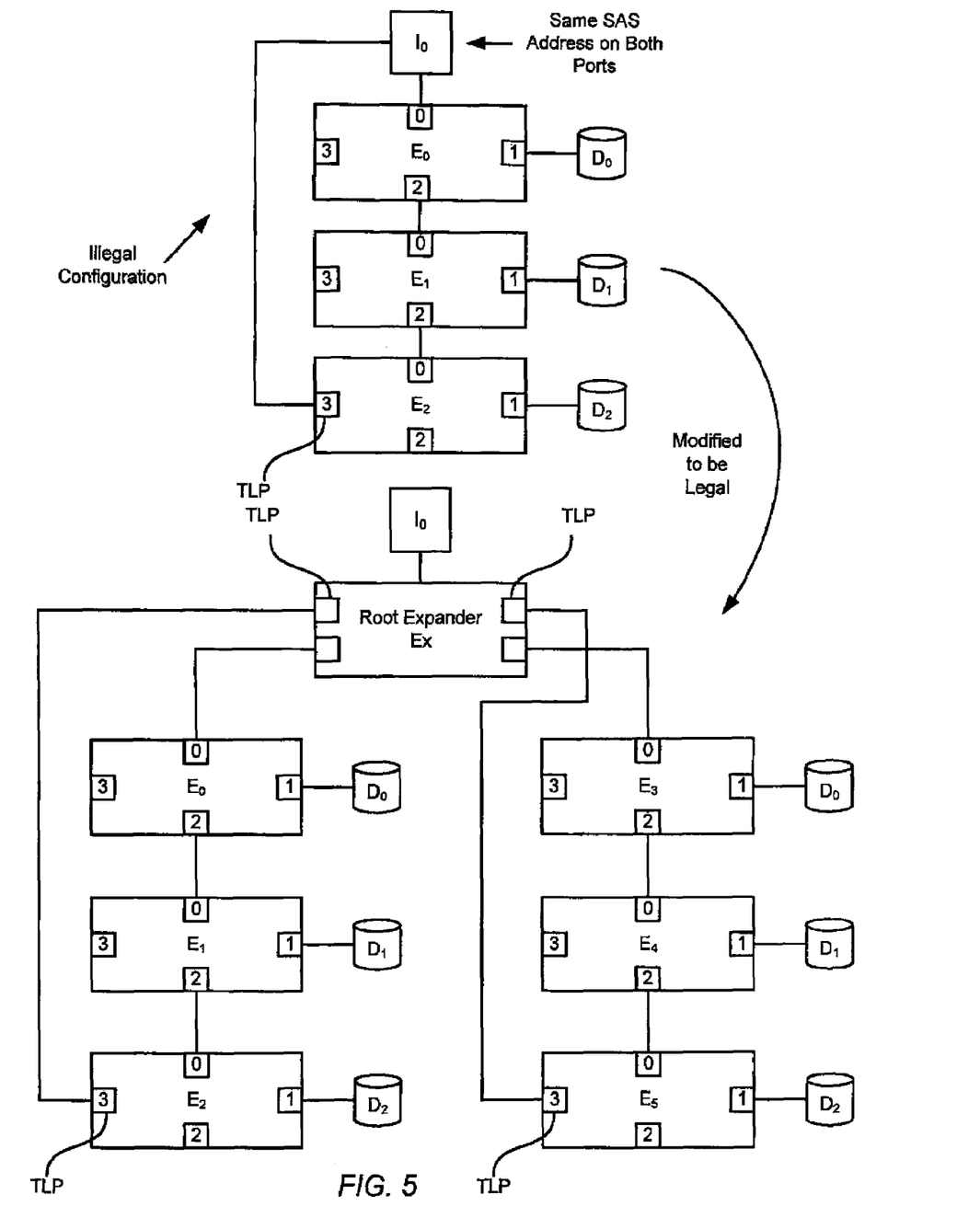
FIG. 5 illustrates an exemplary illegal legacy loop configuration with an initiator that exports the same address on each port that has been converted into a legal legacy loop configuration according to embodiments of the present invention.

FIG. 5 illustrates an exemplary illegal legacy loop configuration 500 with an initiator that exports the same address on each port that has been converted into a legal legacy loop configuration according to embodiments of the present invention. The upper configuration 500 in FIG. 5 is illegal in SAS because initiator I0 exports the same address on both ports, but nevertheless is a common legacy Fibre Channel Arbitrated Loop (FC_AL) topology. Proven, established mechanical designs and cabling have been created for such configurations, and thus it would be advantageous to re-use them by migrating to a new SAS topology using TLPs. According to embodiments of the invention, multiple legacy configurations 500 can be connected together with a root expander Ex providing access to initiator I0. The root expander may have multiple TLPs and loops, each loop for a different rack of drives, for example. All the Phys in the root expander share the same address.

Figure 6:
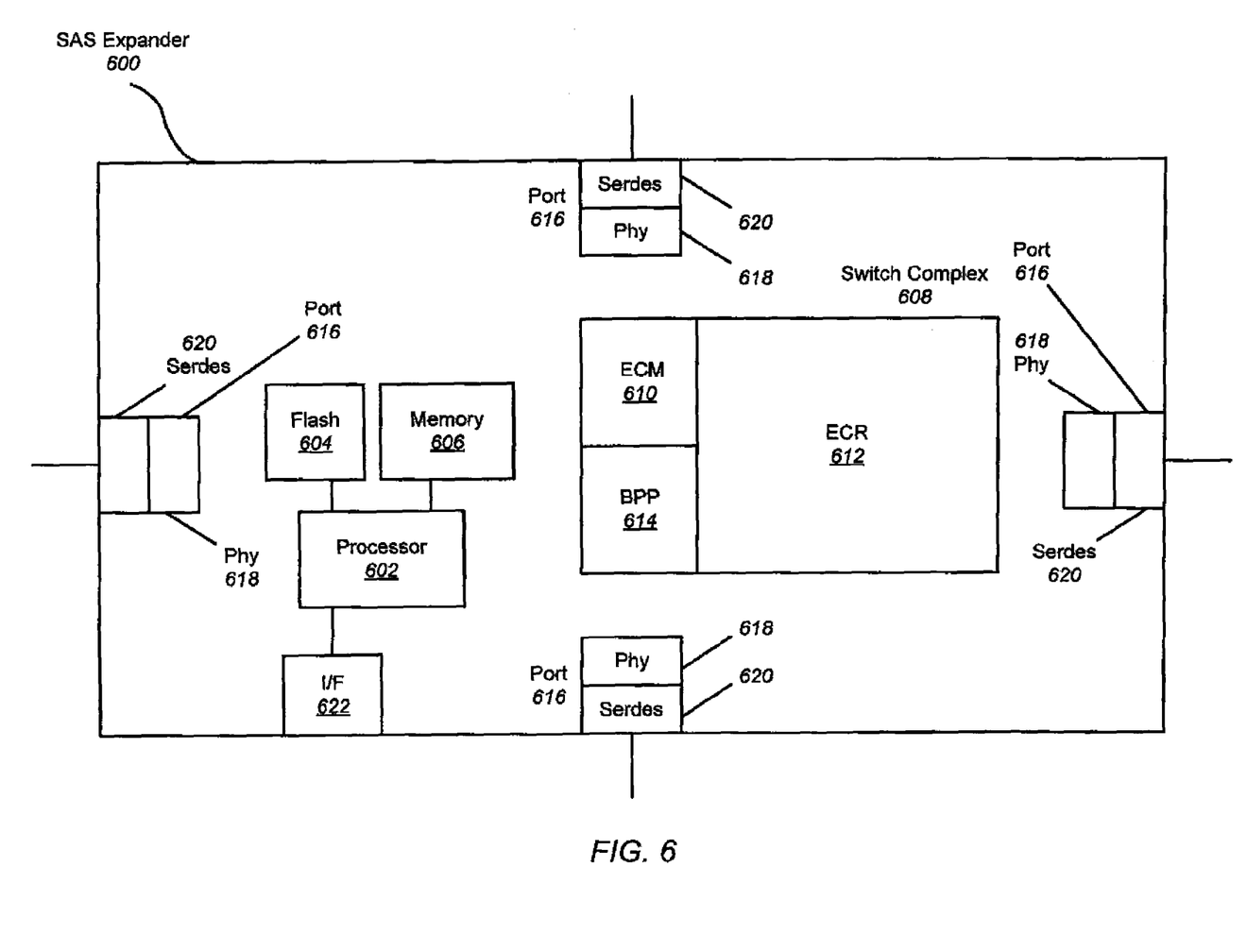
FIG. 6 illustrates an exemplary SAS expander employing table loop attributes according to embodiments of the invention.

FIG. 6 illustrates an exemplary SAS expander 600 employing table loop attributes according to embodiments of the invention. In FIG. 6, SAS expander 600 is shown with processor 602, flash 604, memory 606, and switch complex 608 including an expander connection manager (ECM) 610, expander connection router (ECR) 612, and broadcast primitive processor (BPP) 614. ECM 610 allows pathways to be built between two Phy. ECR 612 can include a crossbar switch, and makes and implements decisions regarding routing connections between Phy. BPP 614 propagates BCNs to all other ports in the SAS expander except the port that caused the BCN to be generated. SAS expander 600 also includes a plurality of ports 616, each including a Phy 618 and a serializer/deserializer (Serdes) 620, and an interface 622 for external out-of-band communications such as configuration commands from an administrator. It should be understood that all SAS expanders shown herein have four ports for simplicity, but that in other embodiments many more ports may be present.

Firmware residing in memory 606 or flash 604, which are forms of computer-readable media, can be executed by processor 604 to perform the operations described above with regard to table loop attributes. Furthermore, memory 606 or flash 604 can store the configuration information, routing tables, and port attributes described above.

Note that this firmware can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples of the computer-readable medium include, but are not limited to, an electrical connection (electronic) having one or more wires, a portable computer diskette (magnetic), a random access memory (RAM) (magnetic), a read-only memory (ROM) (magnetic), an erasable programmable read-only memory (EPROM) (magnetic), an optical fiber (optical), portable optical disc such a CD, CD-R, CD-RW, DVD, DVD-R, or DVD-RW, or flash memory such as compact flash cards, secured digital cards, USB memory devices, a memory stick, and the like. Note that the computer-readable medium could even be paper or another suitable medium upon which the program is printed, as the program text can be electronically captured via optical scanning of the paper or other medium, then compiled, interpreted or otherwise processed in a suitable manner if necessary, and then stored in a computer memory.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A method for enabling loop configurations in a Serial Attached SCSI (SAS) expander network, comprising:
designating a port in a SAS expander as a table loop port (TLP) through which a fail-over path is to be established by assigning a table loop attribute to the port;
while no failure is detected within the SAS expander network, hiding the TLP by blocking the TLP from receiving broadcast change notifications (BCNs); and enabling the TLP by permitting BCNs to be propagated to the TLP when a failure is detected within the SAS expander network.

2. The method of claim 1, wherein hiding the TLP further comprises preventing any devices from appearing in a route table associated with the TLP.

3. The method of claim 1, wherein hiding the TLP further comprises suppressing a reporting of an existence of the TLP back to an initiator in response to an SMP DISCOVER command from the initiator.

4. The method of claim 1, further comprising detecting a failure within the SAS expander network by detecting an existence of only one TLP during expander self-configuration that necessitates using the fail-over path.

5. The method of claim 1, further comprising enabling the TLP by allowing devices connected to the TLP to appear in a route table associated with the TLP.

6. The method of claim 1, further comprising enabling the TLP by reporting an existence of the TLP back to an initiator in response to an SMP DISCOVER command from the initiator.

7. The method of claim 1, further comprising coupling a first loop configuration having the fail-over path and a second loop configuration having another fail-over path via a root expander, and identifying the TLPs associated with each fail-over path.

8. The method of claim 1, further comprising
generating an expander-based routing table associated with the SAS expander, the routing table including the TLP for enabling traffic to be routed through the TLP as well as through expander ports.

9. The method of claim 8, further comprising defining preference paths in the expander-based routing table to route initiator requests through paths in a preferred order.

10. A Serial Attached SCSI (SAS) expander for enabling loop configurations in a SAS expander network, comprising:
a plurality of ports, each port associated with a route table; and
a processor communicatively coupled for configuring the plurality of ports and programmed for
designating one of the plurality of ports as a table loop port (TLP) through which a fail-over path is to be established by assigning a table loop attribute to that port,
while no failure is detected within the SAS expander network, hiding the TLP by blocking the TLP from receiving broadcast change notifications (BCNs), and
enabling the TLP by permitting BCNs to be propagated to the TLP when a failure is detected within the SAS expander network.

11. The SAS expander of claim 10, the processor further programmed wherein hiding the TLP further comprises preventing any devices from appearing in the route table associated with the TLP.

12. The SAS expander of claim 10, the processor further programmed wherein hiding the TLP further comprises suppressing a reporting of an existence of the TLP back to an initiator in response to an SMP DISCOVER command from the initiator.

13. The SAS expander of claim 10, the processor further programmed for initiating a self-configuration process in response to a broadcast change notification (BCN), and detecting a failure within the SAS expander network by detecting an existence of only one TLP during the self-configuration process that necessitates using the fail-over path.

14. The SAS expander of claim 10, the processor further programmed for enabling the TLP by allowing devices connected to the TLP to appear in the route table associated with the TLP.

15. The SAS expander of claim 10, the processor further programmed for coupling a first loop configuration having the fail-over path and a second loop configuration having another fail-over path via a root expander, and identifying the TLPs associated with each fail-over path.

16. The Serial Attached SCSI (SAS) expander of claim 10 wherein the processor is further programmed for generating an expander-based routing table associated with the SAS expander, the routing table including the TLP for enabling traffic to be routed through the TLP as well as through expander ports.

17. The SAS expander of claim 16, the processor further programmed for defining preference paths in the expander-based routing table to route initiator requests through paths in a preferred order.

18. A computer-readable storage medium comprising program code for enabling loop configurations in a Serial Attached SCSI (SAS) expander network, the program code for causing performance of a method comprising: designating a port in a SAS expander as a table loop port (TLP) through which a fail-over path is to be established by assigning a table loop attribute to the port; while no failure is detected within the SAS expander network, any hiding the TLP by blocking the TLP from receiving broadcast change notifications (BCNs); and enabling the TLP by permitting BCNs to be propagated to the TLP when a failure is detected within the SAS expander network.

19. The computer-readable storage medium of claim 18, the program code for causing performance of a method wherein hiding the TLP further comprises suppressing a reporting of an existence of the TLP back to an initiator in response to an SMP DISCOVER command from the initiator to.

20. The computer-readable storage medium of claim 18, the program code for causing performance of a method wherein hiding the TLP further comprises preventing any devices from appearing in a route table associated with the TLP to.

* * * * *